Feb. 7, 1928.

G. W. KELLOGG 1,658,560

OIL CLEANER

Filed July 6, 1925

Inventor
George W. Kellogg
By Blackmore, Spencer & Hulst
Attorney

Patented Feb. 7, 1928.

1,658,560

UNITED STATES PATENT OFFICE.

GEORGE W. KELLOGG, OF FLINT, MICHIGAN, ASSIGNOR TO GENERAL MOTORS CORPORATION, OF DETROIT, MICHIGAN, A CORPORATION OF DELAWARE.

OIL CLEANER.

Application filed July 6, 1925. Serial No. 41,704.

It is well known that the lubricating oil used in internal combustion engines becomes contaminated during operation of the engine. Thus carbon from the combustion chamber, metallic particles worn from the motor and dust from the road find their way into the body of oil and besides acting as abrasives, tend to break the oil film between the moving parts and at the same time promote the emulsion of water and oil thus facilitating the formation of motor oil sludge which in cold weather may effect a complete stoppage of the oil circulating system. Likewise water, which is one of the chemical products of combustion, will leak past the pistons into the crankcase and dilute the oil therein. In winter time this water by freezing in the circulating system as well as by entering into the composition of the motor oil sludge, before referred to, may cause a complete failure in the supply of lubricant with resulting serious injury to the motor.

The object of this invention is to provide an oil cleaner which will effectively remove the bulk of the water and dirt which may find its way into the lubricating oil, thus avoiding the difficulties above described. This cleaner is arranged in the circulating system so that the entire body of oil is continuously subjected to the cleaning action and consists primarily of a settling chamber through which the oil is circulated, preferably rather slowly, the chamber being formed to provide a tortuous path for the passage of the oil between its inlet and outlet and being provided with a sediment trap in the bottom thereof from which sediment may be drawn off from time to time.

More specifically, I have provided a casing having an oil inlet and an oil outlet and a partition arranged between them so that the stream of oil is forced to take a downward course to clear the partition and then to swing upwardly toward the outlet. I have also preferably so formed the inlet that the oil is projected into the casing in a plurality of fine streams at an angle to the direction of flow of the oil in the supply line thereby reducing the rapidity of flow and preventing the formation of strong currents tending to carry oil directly from inlet to outlet and thus disturbing the settling action.

The oil trap to which reference has previously been made preferably consists of baffles having downwardly inclined surfaces to facilitate the passage of the heavier impurities into the bottom of the casing.

Referring now to the drawing and the following specification for a more complete description of my invention:

Figures 1, 2, 3:
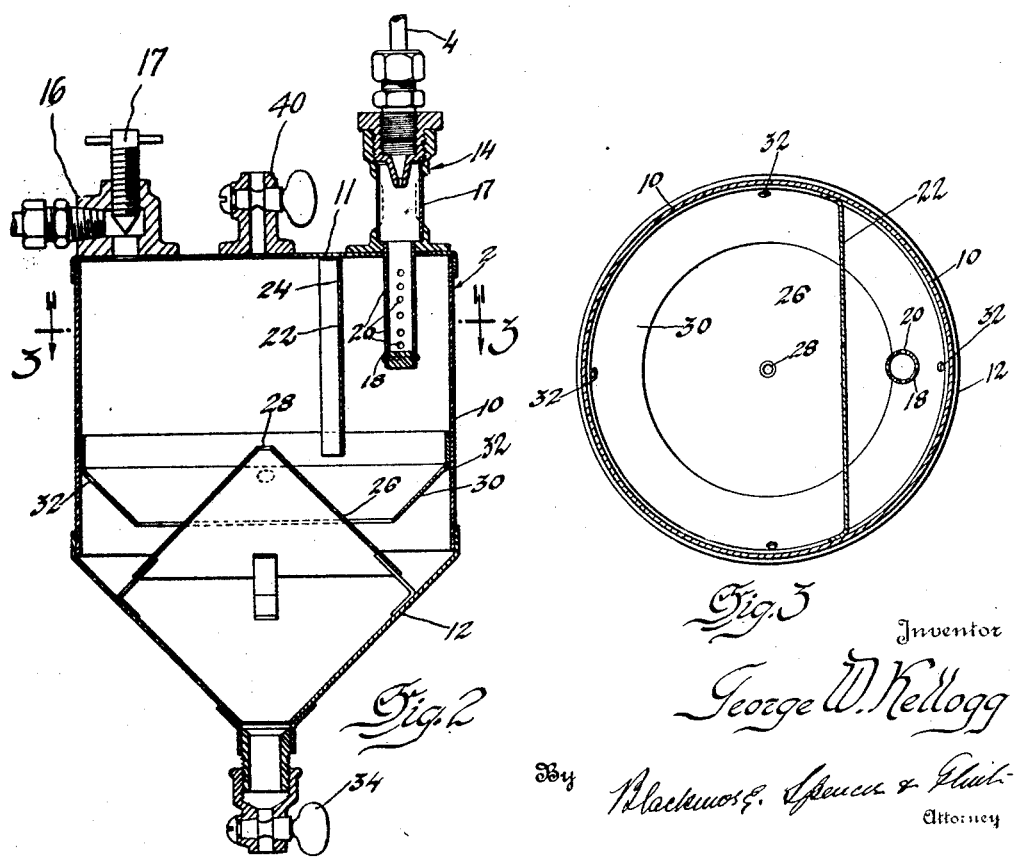
Figure 1 is a side elevation of a conventional automobile engine to which my cleaner is shown applied.
Figure 2 is a vertical sectional view of the cleaner.
Figure 3 is a section on line 3—3 of Figure 2.

On the drawing I have illustrated a conventional automobile engine to which my improved oil cleaner 2 is shown applied. While the cleaner may be mounted in a number of different positions in the oil circulating system I have preferred to show it supplied with oil from a pipe 4 leading from the pipe line 6 going to the customary pressure gauge upon the dash. The cleaned oil is returned to the crankcase through the pipe line 8.

Referring now to the Figures 2 and 3 which show the cleaner in detail, 10 indicates a casing having a top 11 and a tapering bottom 12. At one side of the top is arranged the oil inlet 14 and at the other side the oil outlet 16. I have shown the inlet provided with a sight feed device 17, which may be dispensed with if desired, and a fitting 18 consisting of a tube projecting into the casing 10 and having its lower end closed, the tube being provided with a plurality of lateral apertures 20 through which oil may pass into the casing 10. These apertures are preferably rather small.

Between the inlet and the outlet I have arranged a partition 22. In the upper portion of the partition I have provided an aperture 24 to prevent trapping of air or the building up of siphoning action in the cleaner.

The sediment trap to which reference has been made, is composed of an inverted cone-shaped member 26 mounted upon the tapering bottom of the casing 10 and spaced therefrom. The apex of the cone preferably extends above the bottom of the partition 22 and is apertured as at 28 to prevent the formation of an air pocket. The trap also includes an annular baffle 30 secured to the casing wall and surrounding the member 26, this baffle being provided with apertures 32 for the release of air. At the bottom of the casing is a conventional type of drain consisting of a petcock.

With the construction so far described it will be apparent that oil under pressure from the customary oil pump is supplied to the cleaner through the pipe line 4 and is discharged through the apertures 20 in a number of fine streams into the comparatively large chamber formed by the partition 22 and the casing 10. The direction of the entering oil is thus changed and its flow into the larger passage results in a reduction in its velocity. The oil now passes below the partition 22, the inclination of the surfaces of the baffles 26 and 30 serving to deflect the heavier impurities to the bottom of the casing. The relatively clean oil now passes upwardly into the chamber on the outlet side of the partition 22 whence it may be discharged through the outlet 16. It will be understood that the passage of the oil through the cleaner is very slow so that there is a constant settling of the impurities to the bottom of the cleaner as long as the oil remains therein. The baffles 26 and 30 in addition to deflecting the sediment to the bottom of the tank and pocketing it there also perform the important function of reducing the agitation of the oil resulting from motion of the vehicle which has a disturbing effect on the settling action.

With the construction as so far described it will be apparent that the separator can be drained by opening the pet cock 34 only when the engine is running for otherwise atmospheric pressure will prevent discharge of the fluid. I have accordingly provided my separator with a vent preferably in the form of a pet cock as shown at 40 to permit draining of the oil when the engine is idle.

I have also shown outlet 16 provided with a needle valve 17. The purpose of this valve is to offer sufficient resistance to the passage of oil as to serve to even out fluctuations in the flow. It also provides a convenient means for regulating the rate of flow through the separator.

I claim:

1. An oil cleaner comprising a casing having an inlet and an outlet in the upper portion thereof, a partition arranged between the inlet and the outlet and a sediment trap in the bottom of the casing, said trap comprising a baffle having the form of an inverted cone, an annular baffle surrounding said first named baffle and spaced therefrom, and a fitting for said inlet comprising a tube projecting downwardly into the casing and having a closed end, the walls of said tube being provided with a plurality of apertures.

2. An oil cleaner comprising a casing having a tapered bottom and a top provided with an inlet and an outlet, a partition in said casing between said inlet and outlet, and at one side of the center thereof a centrally arranged baffle in the bottom of the casing having downwardly inclined sides, an annular baffle surrounding the first named baffle, the surface of said annular baffle being likewise downwardly inclined, and a drain for the discharge of sediment from the bottom of the casing.

3. An oil cleaner as defined in claim 2, and a fitting for said oil inlet comprising a tube extending downwardly from the said inlet having its bottom closed and being provided with a plurality of laterally arranged apertures.

4. An oil cleaner comprising a casing having an oil inlet and an oil outlet, a baffle arranged between said inlet and outlet compelling the oil to pass downwardly and then upwardly in its passage from the inlet to the outlet, a baffle below said partition intersecting the plane of the latter and upwardly inclined in the direction of flow of the oil, and a second inclined baffle arranged below said inlet and adapted to direct the entering oil upon said first named inclined baffle in its passage from the inlet to the outlet.

5. The combination as defined in claim 4, and a fitting for said inlet adapted to break up the entering stream of oil.

In testimony whereof I affix my signature.

GEORGE W. KELLOGG.